(12) United States Patent
Farley et al.

(10) Patent No.: US 11,464,167 B2
(45) Date of Patent: Oct. 11, 2022

(54) ROAD TRAVEL SYSTEM FOR AN AGRICULTURAL VEHICLE

(71) Applicant: CNH Industrial America LLC, New Holland, PA (US)

(72) Inventors: Herbert M. Farley, Elizabethtown, PA (US); Cory Hunt, Millersville, PA (US)

(73) Assignee: CNH Industrial America LLC, New Holland, PA (US)

( * ) Notice: Subject to any disclaimer, the term of this patent is extended or adjusted under 35 U.S.C. 154(b) by 513 days.

(21) Appl. No.: 16/674,410

(22) Filed: Nov. 5, 2019

(65) Prior Publication Data

US 2021/0127575 A1 May 6, 2021

(51) Int. Cl.
*A01D 41/14* (2006.01)
*A01B 63/10* (2006.01)
(Continued)

(52) U.S. Cl.
CPC .......... *A01D 41/141* (2013.01); *A01B 63/008* (2013.01); *A01B 63/10* (2013.01); *A01D 41/144* (2013.01); *A01D 41/145* (2013.01); *G01C 21/3826* (2020.08); *A01B 63/08* (2013.01); *A01B 63/108* (2013.01); *A01B 79/005* (2013.01); *A01D 41/12* (2013.01); *A01D 41/127* (2013.01); *B60K 2370/152* (2019.05); *F15B 1/02* (2013.01); *F15B 1/024* (2013.01); *F15B 13/0401* (2013.01); *F15B 15/06* (2013.01); *F15B 2211/3057* (2013.01);
(Continued)

(58) Field of Classification Search
CPC ....... A01B 63/008; A01B 63/08; A01B 63/10; A01B 63/108; A01B 79/005; A01D 41/145; A01D 41/141; A01D 41/144; A01D 41/12; A01D 41/127; B60K 2370/152; F15B 1/02; F15B 1/024; F15B 13/0401; F15B 15/06; F15B 2211/3057
See application file for complete search history.

(56) References Cited

U.S. PATENT DOCUMENTS

| | | |
|---|---|---|
| 5,343,675 A | 9/1994 | Morton |
| 5,415,586 A * | 5/1995 | Hanson ................ A01D 75/287 180/41 |

(Continued)

FOREIGN PATENT DOCUMENTS

WO  2018220433 A1  12/2018

*Primary Examiner* — Arpad Fabian-Kovacs
(74) *Attorney, Agent, or Firm* — Peter Zacharias; Patrick Sheldrake

(57) ABSTRACT

An agricultural vehicle having a chassis, wheels, a power unit, and a header. The header has a center section, at least one wing section extending laterally from the center section, and a wing section support. The center section is movable relative to the chassis, the wing section is movable relative to the center section, and the wing support is movable relative to the wing section. The combine has a control system that is configured to determine that the combine is configured to drive at a road-driving speed, and in response to such determination: operate a center section actuator to move the center section to a raised center section position, operate a wing section actuator to move the wing section to a raised wing section position, and operate a wing support actuator to move the wing support to a raised wing support position.

19 Claims, 4 Drawing Sheets

(51) Int. Cl.
*G01C 21/00* (2006.01)
*A01B 63/00* (2006.01)
*A01D 41/127* (2006.01)
*A01D 41/12* (2006.01)
*F15B 1/02* (2006.01)
*F15B 13/04* (2006.01)
*A01B 79/00* (2006.01)
*A01B 63/108* (2006.01)
*F16H 21/44* (2006.01)
*F15B 15/06* (2006.01)
*A01B 63/08* (2006.01)

(52) U.S. Cl.
CPC ............. *F15B 2211/6336* (2013.01); *F15B 2211/6658* (2013.01); *F15B 2211/7052* (2013.01); *F16H 21/44* (2013.01); *G01C 21/3848* (2020.08)

(56) References Cited

U.S. PATENT DOCUMENTS

| | | | |
|---|---|---|---|
| 5,684,691 A * | 11/1997 | Orbach | A01B 63/112 701/50 |
| 6,058,343 A * | 5/2000 | Orbach | E02F 9/2029 701/50 |
| 6,167,337 A * | 12/2000 | Haack | E02F 9/26 701/1 |
| 6,994,623 B2 | 2/2006 | Isfort et al. | |
| 7,707,811 B1 * | 5/2010 | Strasser | A01D 41/141 56/10.2 E |
| 8,245,489 B2 * | 8/2012 | Talbot | A01D 41/141 56/15.8 |
| 9,980,431 B2 * | 5/2018 | Long | A01D 75/287 |
| 10,216,156 B2 * | 2/2019 | Enns | A01D 41/141 |
| 10,253,789 B2 * | 4/2019 | Brockmann | A01D 41/145 |
| 10,681,865 B2 * | 6/2020 | Dunn | A01D 41/127 |
| 11,032,970 B2 * | 6/2021 | Brimeyer | A01D 41/141 |
| 11,219,162 B2 * | 1/2022 | Brimeyer | A01B 63/008 |
| 11,272,659 B2 * | 3/2022 | Karst | A01D 41/127 |
| 2006/0254239 A1 * | 11/2006 | Fackler | A01D 41/145 56/15.8 |
| 2016/0262307 A1 * | 9/2016 | Smith | A01D 41/12 |
| 2018/0220574 A1 | 8/2018 | Peterson et al. | |
| 2018/0239360 A1 | 8/2018 | Valberg et al. | |
| 2019/0053429 A1 * | 2/2019 | Cook | A01D 41/14 |
| 2019/0124822 A1 | 5/2019 | Czapka et al. | |
| 2020/0337239 A1 * | 10/2020 | Brimeyer | A01D 41/145 |
| 2020/0337240 A1 * | 10/2020 | Brimeyer | A01D 41/141 |
| 2020/0390035 A1 * | 12/2020 | Hunt | A01D 41/127 |
| 2021/0059117 A1 * | 3/2021 | Hunt | A01D 41/144 |
| 2021/0144924 A1 * | 5/2021 | Schrag | A01D 41/145 |
| 2021/0185880 A1 * | 6/2021 | Martin | A01D 34/283 |
| 2021/0392815 A1 * | 12/2021 | Verhoef | A01D 45/021 |
| 2022/0061218 A1 * | 3/2022 | Karst | A01D 75/285 |

\* cited by examiner

ROAD TRAVEL SYSTEM FOR AN AGRICULTURAL VEHICLE

BACKGROUND OF THE INVENTION

Agricultural equipment, such as combines, typically include a header that is movably attached to the chassis of the vehicle. During operation, the header might be raised or lowered to account for variations in the ground level, properties of the particular crop being harvested, and various other operating conditions. The header typically is located at the front of the vehicle, and extends laterally relative to the vehicle's forward direction of travel. In some cases, the header is a single rigid body. In other cases the header is a so-called multi-segment or articulated header comprising multiple sections that are movable relative to each other. For example, the header may have a center section located along the vehicle fore-aft centerline, and a wing section attached at, and extending laterally from, each lateral end of the center section. Devices such as hydraulic or pneumatic cylinders, mechanical linkages, and the like, may be provided to selectively control the heights of the center section and the wing sections.

Agricultural vehicles are sometimes operated on roadways to transport the vehicle for use or storage. It is known to provide features to assist with making the vehicle more road-worthy during such "roading" operations. For example, international application no. PCT/IS2018/000421 discloses an agricultural vehicle having an auxiliary wheel mounted to the feeder housing that joins the header to the chassis. When this vehicle is operated on a road, the auxiliary wheel drops down to support the weight of the feeder housing and header on the road surface. A controller may deploy the auxiliary wheel automatically upon driving the vehicle at a relatively high speed or upon detecting that the vehicle is traveling on a road. Alternatively, the auxiliary wheel may be deployed based on input from the driver. Other devices, such as the machine shown in U.S. Pat. No. 6,994,623, can automatically move a part of the machine (in this case a transfer mechanism) to a desired position for road travel upon turning off the main working device of the machine.

Although certain devices have been provided to automatically convert an agricultural machine to a street driving mode, such systems have not been found to be useful in the context of agricultural vehicles, and particularly combines, having multi-segment headers. Thus, there remains a need to advance the state of the art.

This description of the background is provided to assist with an understanding of the following explanations of exemplary embodiments, and is not an admission that any or all of this background information is necessarily prior art.

SUMMARY OF THE INVENTION

In one exemplary aspect, there is provided an agricultural vehicle having a chassis, wheels supporting the chassis for movement on a surface, a main power unit configured to selectively drive one or more of the plurality of wheels to move the chassis in a forward travel direction, and a header movably mounted to the chassis. The header includes center section, a wing section, and a wing support. The center section extends, in a lateral direction relative to the forward travel direction, from a first lateral end to a second lateral end. The center section is movable relative to the chassis between a lowered center section position and a raised center section position. A center section actuator is configured to move the center section from the lowered center section position to the raised center section position. The first wing section is movably mounted to the first end of the center section and extends in the lateral direction away from the center section. The first wing section is movable relative to the center section between a lowered first wing section position and a raised first wing section position. A first wing section actuator is configured to move the first wing section from the lowered first wing section position to the raised first wing section position. The first wing support is movably mounted to the first wing section, and is movable between a lowered first wing support position and a raised first wing support position. A first wing support actuator is configured to move the first wing support from the lowered first wing support position to the raised first wing support position. The combine also has a control system configured to determine that the combine is configured to drive the one or more of the plurality of wheels at a road driving speed, and in response to such determination: operate the center section actuator to move the center section to the raised center section position, operate the first wing section actuator to move the first wing section to the raised first wing section position, and operate the first wing support actuator to move the first wing support to the raised first wing support position.

In some aspects, one or more of the plurality of wheels may be tracked wheels or have pneumatic tires.

In some aspects, the header may be movably mounted to the chassis by a feeder housing.

In some aspects, the header may be mounted to a front end of the chassis with respect to the forward travel direction.

In some aspects, the first wing section may be pivotally mounted to the center section.

In some aspects, the first wing support may include a gauge wheel pivotally mounted to the first wing section by an arm.

In some aspects, the first wing support may include a skid pivotally mounted to the first wing section.

In some aspects, one or more of the center section actuator, the first wing section actuator, and the first wing support actuator may be a hydraulic actuator.

In some aspects, the control system may be configured to determine that the combine is configured to drive the one or more of the plurality of wheels at the road driving speed by determining that a gear position of a transmission operatively connected between the main power unit and the one or more of the plurality of wheels.

In some aspects, the control system may be configured to determine that the combine is configured to drive the one or more of the plurality of wheels at the road driving speed by determining that a velocity of the chassis in the forward direction equals or exceeds a predetermined velocity.

In some aspects, the control system may be configured to determine that the combine is configured to drive the one or more of the plurality of wheels at the road driving speed by determining that a physical position of the chassis on a map corresponds to a road.

In some aspects, the control system may be further configured to send a signal to a user interface to instruct an operator to engage a power take-off, and after determining that the power take-off is engaged, operate the center section actuator, operate the first wing section actuator and operate the first wing support actuator.

In some aspects, the control system may be further configured, in response to determining that the combine is configured to drive the one or more of the plurality of wheels at a road driving speed, to automatically engage a power take-off configured to transfer power from the main power unit to one or more of the center section actuator, first wing section actuator, and first wing support actuator. The control system also may be further configured to send a signal to a user interface indicating that the power take-off has been activated.

In some aspects, the control system may be further configured, in response to determining that the combine is configured to drive the one or more of the plurality of wheels at a road driving speed, to: automatically activate a secondary power supply, and use the secondary power supply to operate one or more of the center section actuator, the first wing section actuator, and the first wing support actuator.

In some aspects, the header also may include a second wing section movably mounted to the second end of the center section and extending in the lateral direction away from the center section. The second wing section is movable relative to the center section between a lowered second wing section position and a raised second wing section position. A second wing section actuator is configured to move the second wing section from the lowered second wing section position to the raised second wing section position. A second wing support is movably mounted to the second wing section, and is movable between a lowered second wing support position and a raised second wing support position. A second wing support actuator is configured to move the second wing support from the lowered second wing support position to the raised second wing support position. The control system may be configured, in response to determining that the combine is configured to drive the one or more of the plurality of wheels at a road driving speed, to: operate the second wing section actuator to move the second wing section to the raised second wing section position; and operate the second wing support actuator to move the second wing support to the raised second wing support position.

In some aspects, the agricultural vehicle may comprise an agricultural combine having a threshing and separating system.

BRIEF DESCRIPTION OF THE DRAWINGS

Embodiments of inventions will now be described, strictly by way of example, with reference to the accompanying drawings, in which.

In the figures, like reference numerals refer to the same or similar elements.

DETAILED DESCRIPTION OF THE DRAWINGS

Exemplary embodiments of the present invention provide methods and apparatus for adjusting the position of a multi-segment header during road travel to help reduce the likelihood of contacting surrounding objects during such travel. The methods and apparatus may be used in agricultural combines, as described in the examples, but it will be appreciated that other embodiments may be used in other types of machines having a similar arrangement of parts, upon incorporation of the appropriate features of the inventions herein.

Figure 1:
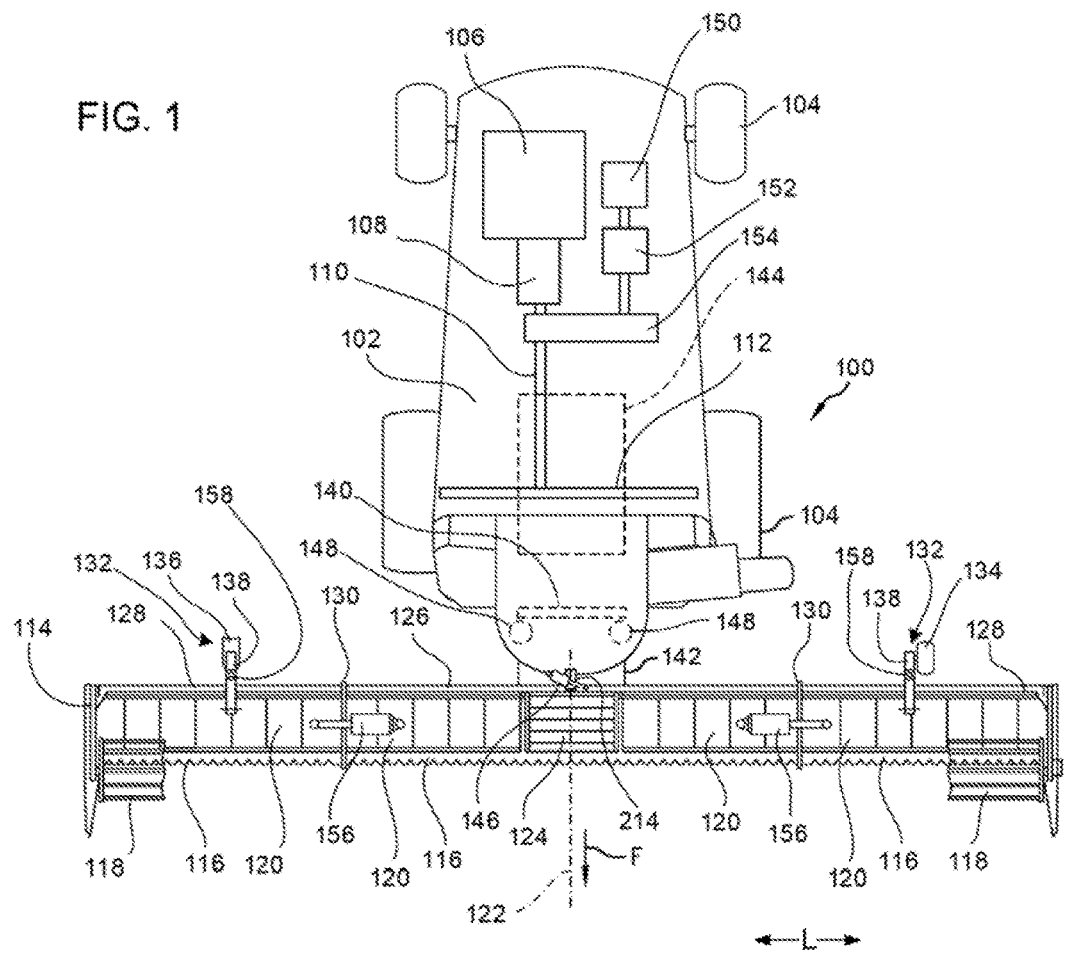
FIG. 1 is a top plan schematic view of an agricultural vehicle of the present invention.
Figure 2:
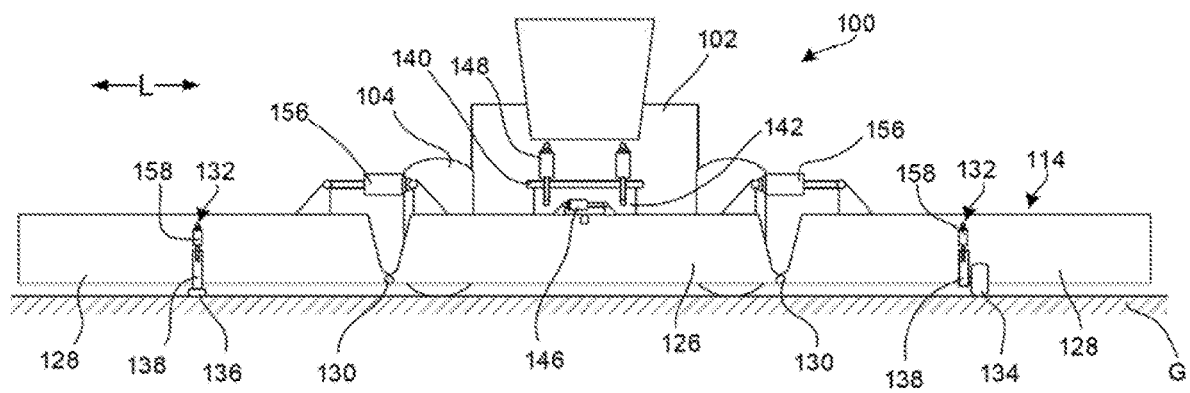
FIG. 2 is a front elevation schematic view of the combine of FIG. 1.

FIGS. 1 and 2 illustrate an example of an agricultural combine 100. The combine 100 has a chassis 102 that is supported for movement on the ground by wheels 104. One or more of the wheels 104 may have conventional pressurized pneumatic tires to transfer rotation to the ground G, or they may be configured as tracked wheel assemblies. A main power unit 106 is mounted on the chassis 102 and configured to drive one or more of the wheels 104. For example, the front wheels 104 may be operatively connected to the main power unit 106 by a transmission 108, a driveshaft 110, and axles 112. If necessary, a differential (not shown) may be provided to alter the rotation axis of the drive shaft 110 to be suitable to drive the axles 112. In other cases, the transmission may be configured as a transaxle to directly drive the axles 112, or other drive configurations may be used, as known in the art. Other embodiments may be configured to drive all of the wheels 104 or just one of the wheels (e.g., in a three-wheeled configuration).

The main power unit 106 may comprise a gasoline or diesel engine, a hybrid electric/gasoline or electric/diesel engine system, a battery-powered electric motor, a turbine, or the like. The transmission 108 is provided to alter the output drive speed of the main power unit 106 to a speed that is more suitable to drive the wheels 104. For example, the transmission 108 may have multiple selectable gear drive paths that operate at different gear reduction ratios to drive the wheels at different rotation speeds for a given main power unit 106 input rotation speed. A two- or three-speed transmission 108 is expected to be suitable for most applications, with the lower gear or gears being suitable for most combine harvesting operations, and the higher gear or gears being suitable for driving the combine 100 on a road surface. During use, the main power unit 106 can be accelerated or decelerated to increase the drive speed of the combine 100 along a forward drive direction F. The transmission 108 also may comprise an constantly-variable gearing system that allows the main power unit 106 to operate at a constant or near-constant speed, while the constantly-variable gear system alters the output gear ratio to drive the wheels 104 at faster or slower speeds. Combine main power units 106 and transmissions 108 are generally known in the art, and other alternatives and variations will be apparent to persons of ordinary skill in the art in view of the present disclosure.

The combine 100 also includes a header 114, which is configured to cut and harvest crop material from the ground as the combine 100 drives in the forward direction F. For example, the header 114 may include one or more cutter bars 116 located at or near the leading edge of the header 114 to cut crops at or near the ground level, and one or more reels 118 configured to pull the crop material backwards towards the header 114 (only the end portions of the reels 118 are shown to better illustrate other parts). The header 114 also may include crop conveyors 120 that are configured to move the crop material at the lateral ends of the header 114 towards the centerline 122 of the header 114. The crop conveyors 120 may be in the form of belts, auger screws, or the like. At the center, the header 114 may include a feeder conveyor 124 that conveys the crop material backwards towards the chassis 102.

The header 114 is a multi-segment, or "articulated," header having a center section 126 that extends laterally from a first end to a second lateral end, and left and right wing sections 128 extending laterally away from the center section 126 from respective ends of the center section 126. The term "lateral" will be understood to mean a direction L that is transverse to the forward drive direction F. The header 114 preferably is mounted to a forward end of the chassis 102, but it may be mounted elsewhere (e.g., at the rear or at some intermediate location under the chassis 102). The shown example has two wing sections 128, but other embodiments may have a single wing section 128. The wing sections 128 are movably mounted to the center section 126. For example, each wing section 128 may be connected to the center section 126 by a respective pivot 130, which is oriented along the forward travel direction F. Alternatively, the wing sections 128 may be mounted by sliding connectors, multi-bar linkages, or other mechanisms.

Each wing section 128 has a wing support 132 that is used to support the wing section 128 on the ground. The wing supports 132 may comprise gauge wheels 134 (such as shown on the right in FIG. 1), rollers, skids 136 (shown on the left in FIG. 1), or the like. The gauge wheels 134 may comprise pneumatic or solid elastic tires or the like to provide smoother rolling on the ground. The wing supports 132 are movably mounted to the respective wing section 128 such that they can be moved up and down relative to establish a minimum ground clearance for the wing section 128. Such adjustability may be provided by mounting each gauge wheel 132 or skid 136 on a respective trailing arm 138 that is mounted to the wing section 128 on a laterally-extending pivot pin or the like. Alternatively, the gauge wheels 132 may be mounted on telescoping sliders or tracks, linkages, cantilevered leaf springs, or the like. While FIG. 1 shows two different types of wing support 132, other embodiments may have a single type of support. Also, multiple wing supports 132 may be provided on each wing section 128.

The center section 126 is movably mounted to the chassis 102 to allow the entire header 114 to move relative to the chassis 102. For example, the center section 126 may be movably mounted to the chassis 102 at a header pivot 140 that extends in the lateral direction L and generally parallel to the ground. The armature joining the center section 126 to the header pivot 140 may comprise a feeder housing 142 that is configured, with conveyor belts, augers or the like, to convey crop material backwards into a threshing and separating system 144 located on or within the chassis 102. The threshing and separating system 144 may include mechanisms such as one or more threshers (e.g., an axial flow thresher), sieves, blowers, and the like, as well as an associate grain hopper and unloader. The details of the threshing and separating system 144 may be of conventional design, as well-known in the art, and need not be described in detail herein. The feeder housing 142 may be rigidly attached to the header 114, or it may be attached by a pivot plate or other articulated joint. In the shown example, the a tilt actuator 146 is provided to control the tilt of the header 114 relative to the feeder housing 142, and thus also relative to the chassis 102. While a feeder housing 142 is typically used to connect the header 114 to the chassis 102, it is also envisioned that the header 114 can be attached to the chassis 102 by a multiple arm linkage or the like.

One or more center section actuators 148 are provided to control the position of the header 114 relative to the chassis 102. The center section actuators 148 may comprise hydraulic telescoping pistons (such as shown), pneumatic telescoping pistons, electric motors, or other drive mechanisms, which may be operated by the main power unit 106 and/or an auxiliary power unit 150, or the like. In the shown example, the center section actuators 148 comprise hydraulic pistons that are operated by pressurized hydraulic fluid supplied by a hydraulic pump and valve system 152. The pump portion of the hydraulic pump and valve system 152 is operated by a power take-off unit 154 that includes gearing, clutches, or other mechanisms, which are configured to convert rotational movement of the main power unit 106 into motion to drive the hydraulic pump to pressurize the hydraulic fluid. Such power take-off mechanisms are well-known in the art and need not be described in detail herein. An auxiliary power unit 150 also may be provided and operatively associated with the hydraulic pump and valve system 152 to power the pump when the power take off unit 154 is either not included in the combine 100, or is not available for operating the hydraulic pump. For instance, if the power take-off unit 154 is driven by the driveshaft 110, the rotation speed may be too great to properly operate the hydraulic pump when the transmission 108 is operated in high gear for road travel. In this case, the power take-off unit 154 can be disengaged from the hydraulic pump, and the auxiliary power unit 150 engaged to drive the pump at a more appropriate speed to operate the center section actuators 148 (and/or other hydraulic actuators) while the transmission 108 is in high gear. The auxiliary power unit 150 may comprise a second power take-off unit that operates at a different gear reduction ratio than the other power take-off unit 154, a gasoline or diesel engine, a turbine, an electric motor, or any other suitable device.

Each wing section 128 includes one or more wing section actuators 156 configured to move the wing section 128 relative to the center section 126. The wing section actuators 156 may comprise hydraulic telescoping pistons (such as shown), pneumatic telescoping pistons, electric motors, or other drive mechanisms, which may be operated by the main power unit 106 and/or the auxiliary power unit 150, such as discussed above in relation to the center section actuators 148. In other embodiments, a single wing section actuator 156 may be provided to control the position of both wing sections 128 (e.g., a single electric motor on the center section 126 that simultaneously retracts or feeds out a separate cable leading to each wing section 128).

Similarly, each wing support 132 includes one or more wing support actuators 158 configured to move the wing support 132 relative to the wing section 128. The wing support actuators 158 may comprise hydraulic telescoping pistons (such as shown), pneumatic telescoping pistons, electric motors, or other drive mechanisms, which may be operated by the main power unit 106 and/or the auxiliary power unit 150, such as discussed above in relation to the center section actuators 148. If multiple wing supports 132 are used on each wing section 128, they may be individually operated by separate wing support actuators 158, or multiple wing supports 132 may be operated by a single wing support actuator 158.

The center section actuators 148, wing section actuators 156 and wing support actuators 158 preferably comprise the same type of actuator to potentially reduce the complexity and cost of the system. For example, in the shown embodiment, all of the actuators 148, 156, 158 comprise hydraulic telescoping pistons (or other hydraulically-operated mechanisms) such that they can all be powered by a single hydraulic pump and valve system 152 by operation of the appropriate hydraulic valves, such as known in the art. In this configuration, the actuators 148, 156, 158 are each connected to the hydraulic pump and valve system 152 by respective hydraulic hoses. The actuators 148, 156, 158 may be single-acting actuators (i.e., only operable to either expand or contract the piston), or double-acting actuators (i.e., operable to selectively expand and contract the piston). Other alternatives and variations will be apparent to persons of ordinary skill in the art in view of the present disclosure.

Figure 3:
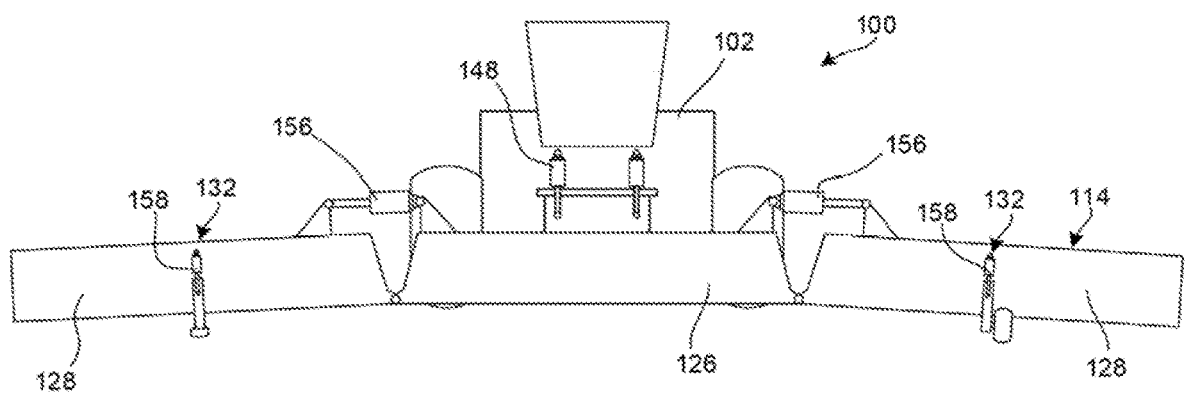
FIG. 3 is a front elevation schematic view of the combine of FIG. 1, showing the header components in respective lowered positions.
Figure 4:
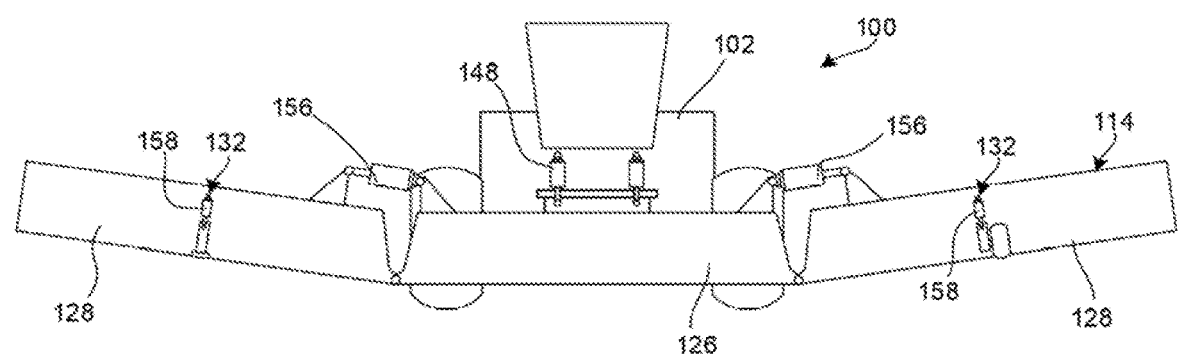
FIG. 4 is a front elevation schematic view of the combine of FIG. 1, showing the header components in respective raised positions.

FIGS. 2-4 illustrate the normal range of movement of the center section 128, wing sections 128 and wing supports 132. Specifically, FIG. 2 shows the center section 128, wing section 128 and wing supports 132 in respective intermediate positions, FIG. 3 shows them in their respective lowered positions, and FIG. 4 shows them in their respective raised positions. It will be appreciated that the center section 128, wing sections 128 and wing supports 132 may move further than shown in the illustrations, such as when the wing sections 128 are moved into a vertical position for flatbed transport or storage. As shown in the figures, the center section 126 is movable relative to the chassis 102 between a lowered center section position (FIGS. 2 and 3) and a raised center section position (FIG. 4). Movement to the raised center section position is performed by operating the center section actuators 148, such as by operating an appropriate valve to increase the hydraulic pressure in the center section actuators 148. Similarly, the wing section actuators 156 are configured to move the wing sections 128 relative to the center section 126 from a lowered wing section position (FIGS. 2 and 3) to a raised wing section position (FIG. 4), and the wing support actuators 158 are configured to move the wing supports 132 from a lowered wing support position (FIGS. 2 and 3) to a raised wing support position (FIG. 4). The actuators 148, 156, 158 may be single-acting mechanisms that are pressurized to lift the respective parts of the header 114, and depressurized to lower the respective parts by gravity, or they may be double-acting mechanisms that apply a force to move the parts downward.

It will be understood that the terms "lowered" and "raised" describe relative positions of the parts, with the lowered position being any position below a relative raised position, the actual range of motion of the parts can vary depending on the embodiment. For example, in some embodiments, the center section 126 may be moveable through a range of a foot or more in the vertical direction, and the wing sections 128 may be movable through a range of 10 or more degrees relative to the center section 126. The wing supports 132 may have a range of motion of several inches. The wing supports 132 may be completely retracted into the wing sections 128 when they are in their highest raised position, or they may remain at least partially below the wing sections 128. It will also be understood that it is not necessary for the actuators to be operable to move the parts through their entire possible range of movement. For example, moving to a storage position may be done by manually or otherwise lifting the component, in which case the associated actuator may be disconnected, if necessary, to allow the desired range of motion.

Figure 5:
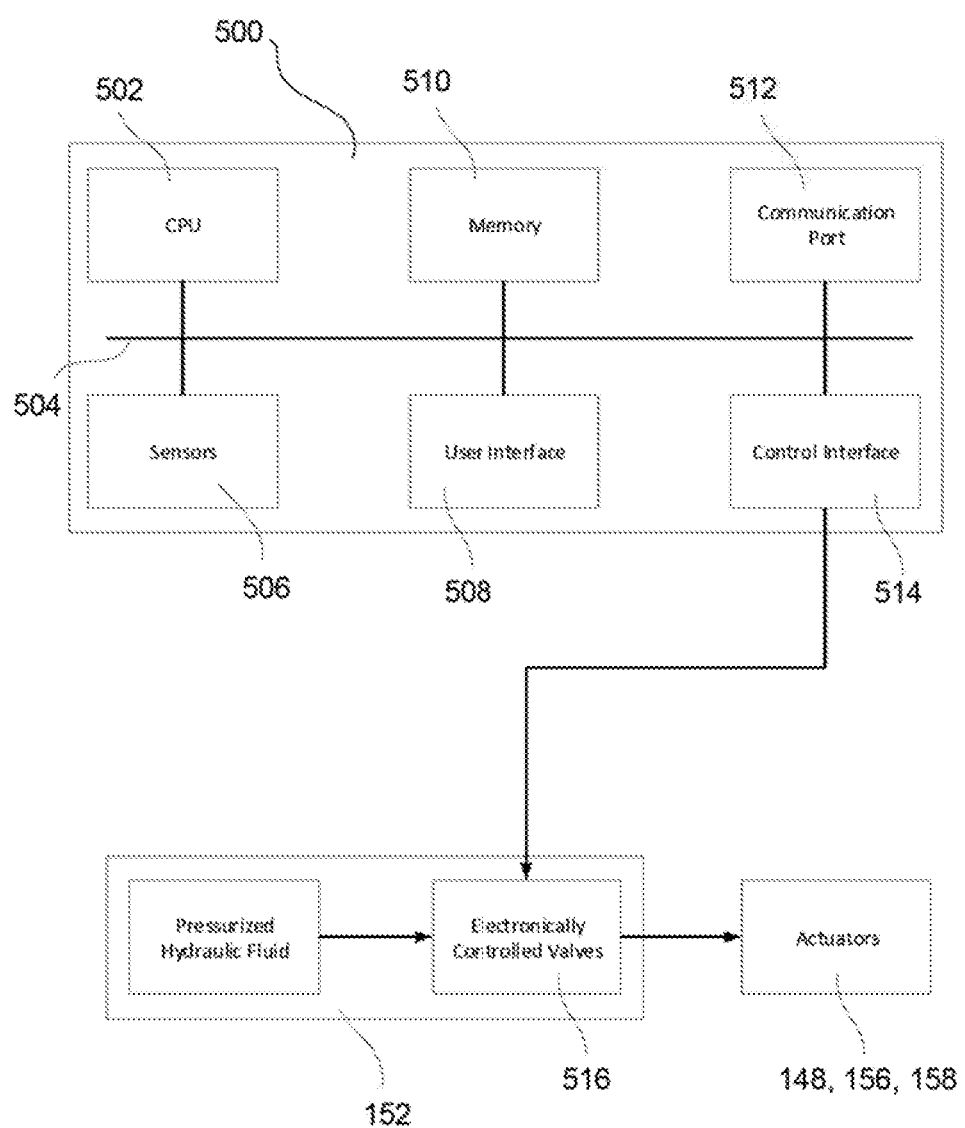
FIG. 5 schematically illustrates an exemplary combine control system and associated components.

Referring now to FIG. 5, the combine 100 also includes a control system 500 that is operatively connected to the actuators 148, 156, 158 to control their operation. The control system 500 includes any suitable arrangement of processors and logical circuits, hardware and programming code effective to perform the desired operations. Here, the exemplary control system 500 comprises a central processing unit (CPU) 502, which is responsible for performing calculations and logic operations required to execute one or more computer programs or operations. The CPU 502 is connected via a data transmission bus 504 to sensors 506 (e.g., pressure transducers in the actuators 148, 156, 158, position sensors, or the like), a user interface 508, and a memory 510. The user interface 508 may comprise any suitable connection port, display, control mechanisms (knobs, levers, switches, etc.) or the like, for operating, programming and customizing the operation of the processing unit 500. The control system 500 also may have a communication port 512 that is operatively connected (wired or wirelessly) to other combine control systems, remote data processing or monitoring systems, or the like.

The CPU 502, data transmission bus 504 and memory 510 may comprise any suitable computing device, such as an INTEL ATOM E3826 1.46 GHz Dual Core CPU or the like, being coupled to DDR3L 1066/1333 MHz SO-DIMM Socket SDRAM having a 4 GB memory capacity or other memory (e.g., compact disk, digital disk, solid state drive, flash memory, memory card, USB drive, optical disc storage, etc.). The selection of an appropriate processing system and memory is a matter of routine practice and need not be discussed in greater detail herein.

The memory 510 stores computer readable instructions that are loaded and executed by the CPU 502 to operate the control system 500. Such instructions are non-transiently stored on a tangible computer readable medium, such as on a magnetic medium, e.g., a computer hard drive, an optical medium, e.g., an optical disc, solid-state memory, e.g., flash memory, or other storage media known in the art. The instructions may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. The instructions also may be stored or accessible in a human-understandable form, e.g., a script, that may be executed on the fly with the aid of an interpreter executed by a computer's central processing unit or by a controller.

The control system 500 also includes a control interface 514 that is operative to send signals to control the operation of the actuators 148, 156, 158. For example, the control interface 514 may comprise a serial port or the like that is in wired communication with electronically controlled hydraulic valves 516 provided as part of the hydraulic pump and valve system 152. Upon sending the appropriate signal to the electronically controlled valves 516, the valves open to allow pressurized hydraulic fluid 518 to pass via hydraulic lines and the opened valves 516 to the corresponding actuators 148, 156, 158. Each valve 516 may be separately controlled to allow individual operation of the actuators 148, 156, 158. The valves 516 also may include a master valve or master control that operates all of the actuators 148, 156, 158 simultaneously. Other alternatives and variations will be apparent to persons of ordinary skill in the art in view of the present disclosure.

Figure 6:
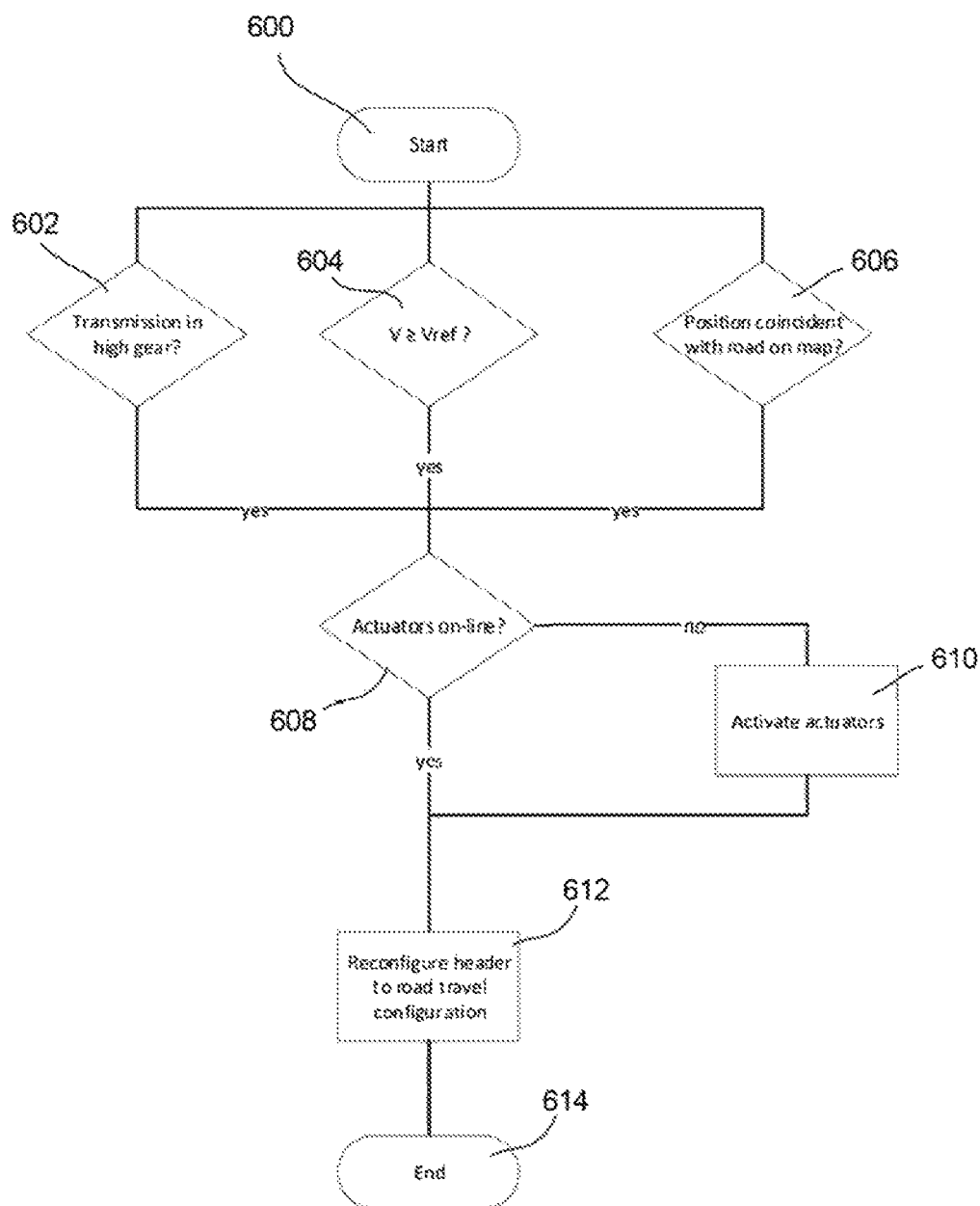
FIG. 6 is an exemplary process for configuring the combine for road travel.

As noted above, it is often desirable to operate an agricultural vehicle having a header, such as a combine 100, on road surfaces. A combine 100 having a multi-segment header 114 poses a particular problem because a multi-segment header 114 is typically wider than a rigid header, and the ends of the header 114 are more likely to contact obstacles that might be located along the road, such as rocks, tree stumps, earth banks, bushes, undergrowth, and the like. FIG. 6 illustrates an example of how this problem can be mitigated by automatically or semi-automatically raising the center section 126, wing sections 128 and wing supports 132 upon determining that the combine 100 is being operated on, or is intended to be operated on, a road.

The process begins at step 600, in which the control system 500 is activated. The control system 500 may be continuously operational when the combine 100 is in operation, or it may be activated at other times. The control system 500 continuously or periodically monitors operating conditions to determine whether the combine 100 is operating on a road, or intended to be operated on a road. This is generally done by evaluating whether the combine is configured to operate the wheels 106 at a road driving speed. This can be determined in various ways. For example, in step 602, the control system 500 determines whether the transmission 108 has been placed into one or more predetermined gears, such as a high gear in a two-speed transmission or third gear in a three-speed transmission. This can be accomplished using sensor feedback, such as by placing a microswitch where it will be closed when the gear lever or a transmission gear yoke is moved to place the transmission 108 in high gear. Where the transmission 108 is electronically operated, the control system 500 can be programmed to determine that the combine 100 is configured to drive the wheels at road speeds by using logical circuits correlating with the operator's selection of high gear. In either case, upon determining that the transmission is positioned in the high gear, the control system 500 concludes that the combine 100 is configured for road speed operation.

Another way of determining whether the combine 100 is operating or intended to be operated at road speeds is by evaluating the actual driving speed of the wheels 105. For example, in step 604, the control system 500 receives sensor feedback from a chassis movement speed indicator, such as a Hall-effect sensor on the driveshaft 110, axle 112, or the like, or a speed evaluation provided by electronics such as a global positioning system ("GPS"). Upon determining that the chassis 102 is moving at a forward speed V that is equal to or exceeds a predetermined velocity $V_{ref}$, the control system 500 concludes that the combine is configured for road speed operation. This process may be useful when the transmission gearing is not necessarily indicative of road operation. For example, in a three-speed transmission, the second gear may be operated for harvesting or road operation, depending on the main power unit 106 rotation speed.

A third way to determine that the combine 100 is configured for operating at road speeds is by determining that the combine 100 is physically located on a known road surface. For example, the control system 500 may use a GPS or other position sensing position, along with an associated geographic map, to determine whether the combine 100 is operating on a road identified on the map. This method may be helpful to determine that the combine is configured to operate at road speeds even when the transmission has not yet been moved to high gear, and before the combine 100 accelerates to the road speed.

It is also envisioned that the control system 500 could determine that the combine 100 is configured to operate at road speeds using other methods. For example, the control system 500 may include a sensor configured to evaluate the surface below the chassis to determine whether it is characteristic of a road surface. This may be done using optical analysis of the surface (e.g., identifying colors or features of a road or features that are not indicative of operation on soil), sound wave analysis to detect the hardness of the surface, detecting characteristics of the vehicle operation (e.g., vibrations or suspension movement characteristic of road or non-road operation), and so on. Other alternatives and variations will be apparent to persons of ordinary skill in the art in view of the present disclosure.

Any one of the foregoing methods may be used to determine that the combine 100 is configured to operate at road speeds, or other methods may be implemented. It is also expected that the combination of two or more methods may be particularly beneficial for the reasons noted above. The control system 500 can operate to monitor the various road driving indicators using a monitoring loop, executing finite-state machines or hierarchical control regimes, using a neural model, or using any other computer operating regime, as known in the art.

Upon determining that the combine 100 is configured to drive the wheels 104 at a road driving speed, the control system 500 moves to step 608, where it determines whether the actuators 148, 156, 158 are currently operational. This step may be used in embodiments in which the actuators 148, 156, 158 are disabled upon placing the combine 100 into the road traveling configuration. For example, placing the transmission 108 into high gear in a two-speed system, or into third gear in a three-speed system, might automatically decouple the power take-off unit 154 from the hydraulic pump and valve system 152 to prevent damage the hydraulic system from operating at potentially harmful speeds. This step may be omitted if the actuators 148, 156, 158 are not disabled during normal operation.

If the actuators 148, 156, 158 are not active, the process moves to step 610, in which the actuators 148, 156, 158 are activated. Step 610 may be performed automatically or with some form of user interaction. For automatic operation, the control system 500 can, for example, temporarily engage the power take-off unit 154 if the driveshaft speed is below an operational threshold value, and engage a routine (e.g., a throttle control override) to prevent the operator from accelerating past the threshold value until the actuators have been used to reconfigure the header components in step 612. If the driveshaft 110 (or other power take-off unit drive source) is rotating faster than a safe level, the control system 500 could activate a speed control override to slow the main power unit 106 to a speed that allows safe operation of the hydraulic pump and valve system 152. Alternatively, the control system 500 could temporarily engage an auxiliary power unit 150 to operate the hydraulic pump and valve system 152, or activate other auxiliary power units, to operate the actuators 148, 156, 158 to reconfigure the header components to the road travel position. Upon performing an automatic actuator engagement routine, the control system 500 may transmit a message to the user interface 508 to signal to the operator that the operation is being performed. For example, a text message and an audible signal may be sent to a computer or touchscreen control display in the operator cabin, or a warning light may be illuminated.

Step 610 also may be performed with operator interaction. For example, upon determining that the combine is configured for operation at road speeds, the control system 500 may send a signal to the user interface 508 to instruct the operator to slow the combine 100, change to a different drive gear, and/or temporarily engage the power take-off unit 152 or an auxiliary power unit 150. Other alternatives and variations will be apparent to persons of ordinary skill in the art in view of the present disclosure.

Upon determining that the actuators 148, 156, 158 are operational in step 608, or reactivating them in step 610, the process moves to step 612. Here, the control system 500 generates and transmits the appropriate signals to the valves 516 or other control mechanisms to reconfigure the center section 126, wing sections 128 and wing supports 132 to a road travel configuration. Specifically, the control system operates the center section actuator 148 to move the center section 126 to the raised center section position, operates the wing section actuators 156 to move the wing section 128 to the raised wing section position, and operates the wing support actuators 158 to move the wing supports 132 to the raised wing support position. In these positions, the header general is least likely to encounter roadside obstacles, enabling higher speed road travel. Step 612 also may be performed with operator interaction. For example, the control system 500 may send a message to the user interface 508 instructing the operator to manually operate one or more of the actuators 148, 156, 158 to move the associated header components to their raised positions.

The control system 500 also may be programmed to perform step 612 (or send instructions to the operator to perform step 612) under other operating circumstances. For example, the control system 500 may be programmed to monitor the state of a manual user input option, such as an override button or switch that the operator can activate to raise the header component. As another example, the control system 500 can monitor whether the transmission 108 is placed in a reverse drive gear or is moving in reverse. As still another example, the control system 500 may monitor whether the combine 100 is operating in an error condition, such as if the drive wheels are operating at speed but the combine 100 is not physically moving (indicating wheel slip). Other alternatives and variations will be apparent to persons of ordinary skill in the art in view of the present disclosure.

After completing the reconfiguration in step 612, the control system 500 moves to step 614, where the process ends. Alternatively, the process may continue to monitor the road speed configuration indicators in steps 602, 604 and 606 (or other indicators). When there are no indicators that the combine is configured to operate at road speeds the control system 500 may automatically return the header components to their starting or harvesting use positions. To prevent rapid cycling between configurations, a timer may be provided to delay configuration changes, or a signal may be sent to the operator to approve each reconfiguration process. Other options will be readily apparent in view of the present disclosure.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

The invention claimed is:

1. An agricultural vehicle comprising:
a chassis;
a plurality of wheels supporting the chassis for movement on a surface;
a main power unit configured to selectively drive one or more of the plurality of wheels to move the chassis in a forward travel direction;
a header movably mounted to the chassis, the header comprising:
a center section extending, in a lateral direction relative to the forward travel direction, from a first lateral end to a second lateral end, the center section being movable relative to the chassis between a lowered center section position and a raised center section position,
a center section actuator configured to move the center section from the lowered center section position to the raised center section position,
a first wing section movably mounted to the first end of the center section and extending in the lateral direction away from the center section, the first wing section being movable relative to the center section between a lowered first wing section position and a raised first wing section position,
a first wing section actuator configured to move the first wing section from the lowered first wing section position to the raised first wing section position,
a first wing support movably mounted to the first wing section, the first wing support being movable between a lowered first wing support position and a raised first wing support position,
a first wing support actuator configured to move the first wing support from the lowered first wing support position to the raised first wing support position; and
a control system configured to determine that the combine is configured to drive the one or more of the plurality of wheels at a road driving speed, and in response to such determination:
operate the center section actuator to move the center section to the raised center section position,
operate the first wing section actuator to move the first wing section to the raised first wing section position, and
operate the first wing support actuator to move the first wing support to the raised first wing support position.

2. The agricultural vehicle of claim 1, wherein one or more of the plurality of wheels comprise tracked wheels.

3. The agricultural vehicle of claim 1, wherein one or more of the plurality of wheels comprise pneumatic tires.

4. The agricultural vehicle of claim 1, wherein the header is movably mounted to the chassis by a feeder housing.

5. The agricultural vehicle of claim 1, wherein the header is mounted to a front end of the chassis with respect to the forward travel direction.

6. The agricultural vehicle of claim 1, wherein the first wing section is pivotally mounted to the center section.

7. The agricultural vehicle of claim 1, wherein the first wing support comprises a gauge wheel pivotally mounted to the first wing section by an arm.

8. The agricultural vehicle of claim 1, wherein the first wing support comprises a skid pivotally mounted to the first wing section.

9. The agricultural vehicle of claim 1, wherein one or more of the center section actuator, the first wing section actuator, and the first wing support actuator comprises a hydraulic actuator.

10. The agricultural vehicle of claim 1, wherein the control system is configured to determine that the combine is configured to drive the one or more of the plurality of wheels at the road driving speed by determining that a gear position of a transmission operatively connected between the main power unit and the one or more of the plurality of wheels.

11. The agricultural vehicle of claim 1, wherein the control system is configured to determine that the combine is configured to drive the one or more of the plurality of wheels at the road driving speed by determining that a velocity of the chassis in the forward direction equals or exceeds a predetermined velocity.

12. The agricultural vehicle of claim 1, wherein the control system is configured to determine that the combine is configured to drive the one or more of the plurality of wheels at the road driving speed by determining that a physical position of the chassis on a map corresponds to a road.

13. The agricultural vehicle of claim 1, wherein the control system is further configured to send a signal to a user interface to instruct an operator to engage a power take-off, and after determining that the power take-off is engaged, operate the center section actuator, operate the first wing section actuator and operate the first wing support actuator.

14. The agricultural vehicle of claim 1, wherein the control system is further configured, in response to determining that the combine is configured to drive the one or more of the plurality of wheels at a road driving speed, to automatically engage a power take-off configured to transfer power from the main power unit to one or more of the center section actuator, first wing section actuator, and first wing support actuator.

15. The agricultural vehicle of claim 14, wherein the control system is further configured to send a signal to a user interface indicating that the power take-off has been activated.

16. The agricultural vehicle of claim 1, wherein the control system is further configured, in response to determining that the combine is configured to drive the one or more of the plurality of wheels at a road driving speed, to:
   automatically activate a secondary power supply, and
   use the secondary power supply to operate one or more of the center section actuator, the first wing section actuator, and the first wing support actuator.

17. The agricultural vehicle of claim 1, wherein the header further comprises:
   a second wing section movably mounted to the second end of the center section and extending in the lateral direction away from the center section, the second wing section being movable relative to the center section between a lowered second wing section position and a raised second wing section position;
   a second wing section actuator configured to move the second wing section from the lowered second wing section position to the raised second wing section position;
   a second wing support movably mounted to the second wing section, the second wing support being movable between a lowered second wing support position and a raised second wing support position; and
   a second wing support actuator configured to move the second wing support from the lowered second wing support position to the raised second wing support position.

18. The agricultural vehicle of claim 17, wherein the control system is configured, in response to determining that the combine is configured to drive the one or more of the plurality of wheels at a road driving speed, to:
   operate the second wing section actuator to move the second wing section to the raised second wing section position; and
   operate the second wing support actuator to move the second wing support to the raised second wing support position.

19. The agricultural vehicle of claim 1, wherein the agricultural vehicle comprises an agricultural combine having a threshing and separating system in operative communication with the header.

* * * * *